(12) United States Patent
Avellan

(10) Patent No.: US 11,943,044 B1
(45) Date of Patent: Mar. 26, 2024

(54) CONTINUOUS COMMUNICATION SYSTEM USING PAIRED IDENTICAL SMALL SATELLITES

(71) Applicant: AST & Science, LLC, Miami, FL (US)

(72) Inventor: Abel Avellan, Coral Gables, FL (US)

(73) Assignee: AST & Science, LLC, Miami, FL (US)

( * ) Notice: Subject to any disclaimer, the term of this patent is extended or adjusted under 35 U.S.C. 154(b) by 673 days.

(21) Appl. No.: 16/827,139

(22) Filed: Mar. 23, 2020

Related U.S. Application Data

(60) Provisional application No. 62/821,713, filed on Mar. 21, 2019.

(51) Int. Cl.
*H04B 7/185* (2006.01)

(52) U.S. Cl.
CPC ..... *H04B 7/18541* (2013.01); *H04B 7/18521* (2013.01)

(58) Field of Classification Search
CPC ............ H04B 7/18541; H04B 7/18521; H04B 7/18513; H04B 7/185; H04B 7/1851
See application file for complete search history.

(56) References Cited

U.S. PATENT DOCUMENTS

| | | | |
|---|---|---|---|
| 9,775,191 | B2 | 9/2017 | Jayasimha et al. |
| 2007/0045474 | A1* | 3/2007 | Bae ............ B64G 1/1085 244/171.1 |
| 2010/0279604 | A1* | 11/2010 | Wood ............ H04B 10/118 455/12.1 |
| 2018/0084476 | A1* | 3/2018 | Kay ................ H04L 45/22 |
| 2018/0359670 | A1* | 12/2018 | Fang ............. H04W 36/08 |
| 2019/0170949 | A1* | 6/2019 | Collier ........... G02B 6/3879 |

FOREIGN PATENT DOCUMENTS

| | | | | |
|---|---|---|---|---|
| CN | 103675804 B | * | 8/2016 | ........... G01S 13/74 |
| JP | 11127098 A | * | 5/1999 | |
| JP | 2002173099 A | * | 6/2002 | |

* cited by examiner

*Primary Examiner* — Keith Ferguson
(74) *Attorney, Agent, or Firm* — Botos Churchill IP Law LLP

(57) ABSTRACT

A communication system has a first satellite, a second satellite, and a physical or wireless connection connecting the first satellite with the second satellite. The satellites each communicate with a different ground station and ensure continuous communication during handover.

19 Claims, 1 Drawing Sheet

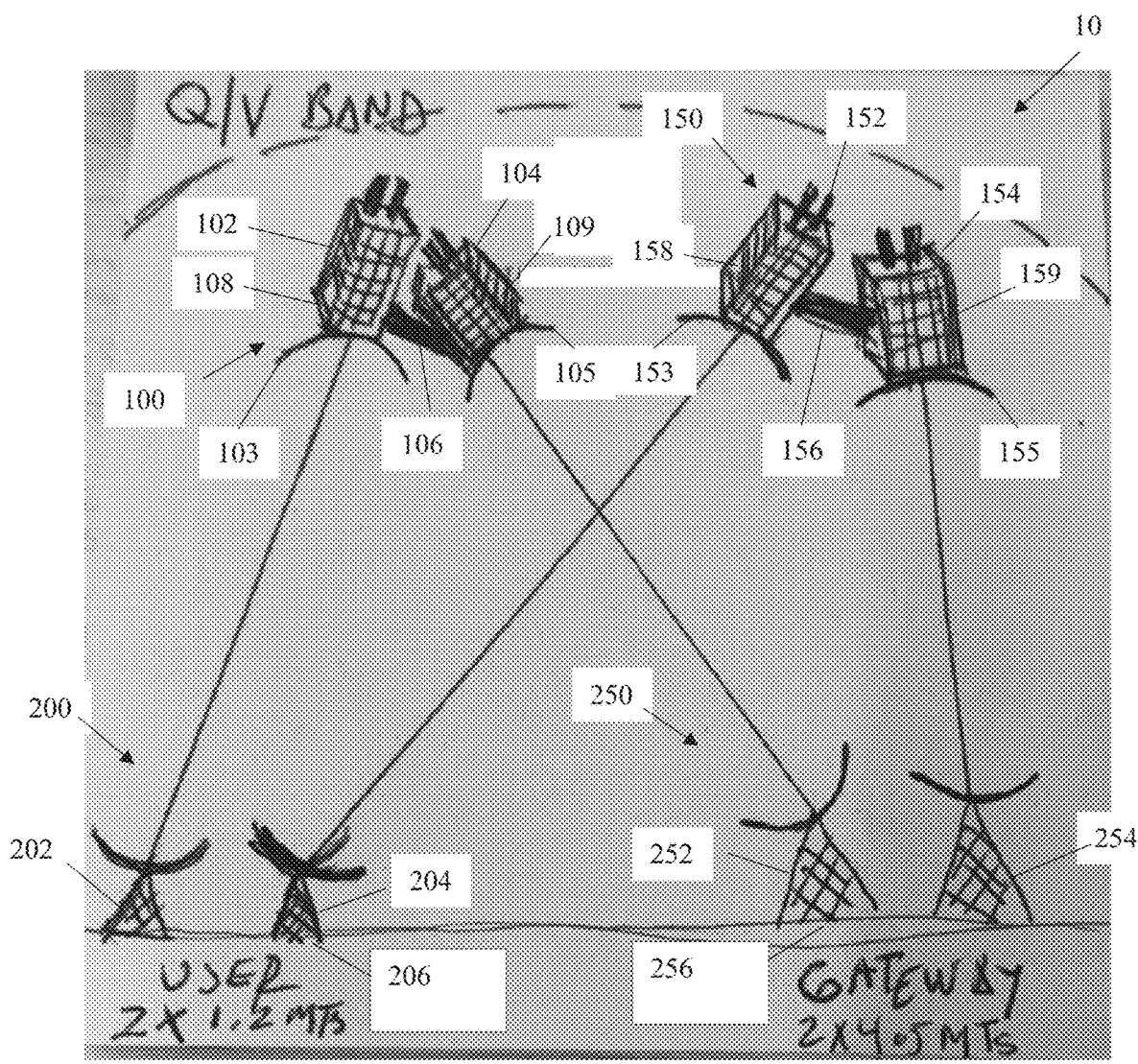

CONTINUOUS COMMUNICATION SYSTEM USING PAIRED IDENTICAL SMALL SATELLITES

RELATED APPLICATION

This application claims the benefit of priority of U.S. Provisional Application No. 62/821,713, filed on Mar. 21, 2019, the content of which is relied upon and incorporated herein by reference in its entirety.

FIELD OF THE DISCLOSURE

The present disclosure relates to non-geostationary satellite hand-off BACKGROUND OF THE RELATED ART As satellites orbit the earth, they communicate with ground station stations having one or more ground station antennas. The ground station tracks a satellite as it enters the ground station field of view (ascending satellite) until it is leaving the field of view (descending satellite). To have continuous communication, the ground station must acquire communication with a new ascending antenna entering its field of view before it loses communication with the descending satellite, which is a process referred to as handover or hand-off. One example of satellite hand-off is disclosed in U.S. Pat. No. 9,775,191, which is incorporated herein by reference.

SUMMARY

A communication system has a first satellite, a second satellite, and a physical or wireless connection connecting the first satellite with the second satellite. The satellites each communicate with a different ground station and ensure continuous communication during handover.

BRIEF DESCRIPTION OF THE FIGURES

FIG. 1 shows the satellite hand-off system of the present disclosure.

DETAILED DESCRIPTION

In describing the preferred embodiments of the present invention illustrated in the drawings, specific terminology is resorted to for the sake of clarity. However, the present invention is not intended to be limited to the specific terms so selected, and it is to be understood that each specific term includes all technical equivalents that operate in a similar manner to accomplish a similar purpose.

Turning to the drawing, FIG. 1 shows the paired satellite system 10 in accordance with a non-limiting illustrative example embodiment of the invention. The system 10 has at least one paired satellite assembly, and here is illustrated with a first paired satellite assembly 100 and a second paired satellite assembly 150, though any suitable number of paired satellite assemblies can be provided. In addition, while each assembly 100, 150 is shown here to have two satellites, each assembly 100, 150 can have any suitable number of satellites, including more than two. The first and second assemblies 150 each have a first satellite 102, 152, a second satellite 104, 154, and a connection or link 106, 156.

The first and second satellites 102, 152, 104, 154 are separate and discrete complete satellites, and can be any suitable satellite, such as for example a CubSat. Thus, each satellite includes its own antenna 103, 105, 153, 155 and processing device 108, 109, 158, 159, such as a processor or controller that controls operation of the satellite including, for example, flight control, pointing and operating the antenna 103, 105, 153, 155, flight thrusters, and communications including the receiving and transmitting of signals with a ground station. It should be noted, however, that when the satellites are coupled together, certain functions and features can be shared or performed by one satellite and not the other. For example, only one satellite can have a processing device and that processing device of the one satellite can control the operations of both satellites.

In one embodiment of the invention, the first satellites 102, 152 and second satellites 104, 154 of each pair 100, 150 are identical to each other, though in other embodiments the satellites 102, 152, and 104, 154 can be different types of satellites or have different size, shape, structure and/or operation. Thus, each pair can have identical satellites or different types of satellites. In addition, the paired satellite assemblies 100, 150 can be in any suitable orbit, such as for example Low Earth Orbit (LEO) or any non-geostationary orbit. The first paired assembly 100 can be traveling in a different orbit/path as the second paired assembly 150, or they can be in the same or substantially the same orbit/path. The satellites 102, 152, 104, 154 communicate with one or more antennas 202, 204, 252, 254 of one or more ground stations 200, 254 by beams formed at the satellite and/or at the antennas.

The connection or link 106, 156 connects the first satellite 102, 152 with the second satellite 104, 154, respectively as shown. The connection 106, 156 can be electrical, so that the first satellite 102, 152 are in wired or wireless communication with the second satellite 104, 154, respectively. In one embodiment, the connection 106, 156 can be an electrical cable, a wireless connection, or other communication link. The connection 106, 156 provides a high-speed link.

In addition to having linked communications, the connection 106, 156 can physically or mechanically couple the first satellite 102, 152 to the second satellite 104, 154, so that the first satellites 102, 152 are physically linked and travel together in space with the second satellites 104, 154, respectively. In one embodiment, the connection 106, 156 can be a rigid rod or bar having a first end and a second end. The first end can include a first pivot mechanism or device that pivotally or rotationally connects to the first satellite 102, 152. The second end can be opposite the first end and include a second pivot mechanism or device that pivotally or rotationally connects to the second satellite 104, 154, so that the satellites 102, 152, 104, 154, respectively, can pivot or rotate in all directions and especially 360 degrees parallel to one another, as well as angularly inward and outward from each other.

Thus, as shown, the connection 106, 156 can have a predetermined length to maintain a predetermined fixed distance between the first satellite 102, 152 and the second satellite 104, 154. That distance can be as close as possible to each other but sufficiently apart from one another so that the satellites do not inadvertently come into contact or otherwise get damaged. And, the first satellite 102, 152 can pivot or rotate with respect to the second satellite 104, 154, respectively. Thus, though the first and second satellites 102, 152, and 104, 154 are co-located and form a constellation, each satellite 102, 152, 104, 154 can form or communicate with a different ground station and/or beam.

Still in other embodiments of the invention, the physical connection 106, 156 can be wireless. For example, the satellites 102, 152, 104, 154 can have electromagnetics that physically maintain the first satellites 102, 152 at or within a predetermined distance to the second satellites 104, 154, respectively. Or, the satellites 102, 152, 104, 154 can have thrusters that are controlled by avionics, such as a controller, to maintain the first satellite 102, 152 at or within a predetermined distance to the second satellites 104, 154, respectively.

FIG. 1 also shows the satellite pairs 100, 150 during handover with a first ground station assembly 200 and a second ground station assembly 250. The first ground station assembly 200 has a first antenna 202 and a second antenna 204, and the second ground station assembly 250 has a first antenna 252 and a second antenna 254. In one example embodiment, the first ground station assembly 200 can be, for example, a user, and the second ground station assembly 250 can be, for example, a gateway.

In one example embodiment shown, the first and second paired satellite assemblies 100 are travelling to the right (in the FIGURE). Accordingly, the second paired assembly 150 is leaving the first communication area/zone or field of view (e.g., line of sight) of the first ground station assembly 200 (i.e., descending) and entering the second communication area of the second ground station assembly 250, and the first paired assembly 150 is entering the first communication area or field of view (i.e., ascending). As shown in FIG. 1, the system 10 enables seamless communication handover at the first ground station 200 (and the second ground station 250, though only the first ground station 200 is discussed in this example) as the satellite assemblies 100, 150 travel in orbit. That is, the first ground station 200 will establish communication with the first paired satellites 100 before it loses communication with the second paired satellites 150.

Beginning at an initial time T0, the satellites 152, 154 of the second pair 150 communicate with one or both of the first and second antenna 202, 204 of the first ground station 200. At a first time period T1, the first pair 100 is entering the first communication zone. Accordingly, the first pair 100 comes within range of the first communication zone, and the first and/or second satellite 102, 104 establish communication with the first or second antennas 202, 204. That is, the first and/or second antennas 252, 254 of the first ground station acquire one or both of the satellites 102, 104 of the ascending satellite pair 100, and track those satellites.

This happens before the second pair 150 completely descends and leaves the first communication zone and stops communicating with the first ground station 200. Thus, at least one or both of the satellites 102, 104 initiate communication with the first ground station 200 before the second pair 150 initiates communication with the second ground station 250, or after one of the satellites 152, 154 of the second pair 150 initiates communication with one of the antenna 252, 254 of the second ground station 250. That is, at least one or both of the satellites 102, 104 start communicating with the first ground station 200 while the first ground station is still communicating with at least one of the satellites 152, 154 of the second pair, i.e., before the first ground station 200 loses all communication with the second pair 150.

At a second time period T2, the second pair 150 continues to leave the first communication zone. Accordingly, the satellites 152, 154 of the second pair 150 come within range of the second communication zone of the second ground station 250. The second satellite 154 redirects from the first ground station 200 to the second ground station 250, so it stops communicating with the second antenna 204 of the first ground station 200 and starts communicating with the first antenna 254 of the second ground station 250.

And at a third time period T3, the second paired satellites 150 completely leave the first communication zone, whereby both of the satellites 152, 154 communicate with the second ground station 250 and not with the first ground station 200—or the second satellite 154 has redirected to a third ground station (not shown) and the first satellite 152 communicates with the second ground station 250. Prior to time T3, the first pair 100 has established communication with the first ground station 200, so that the first ground station 200 has a seamless handover from the second satellite pair 250 to the first satellite pair 200. Thus, the first ground station 200 has seamless and continuous communication because it has established communication with the first pair 200 before the second pair 250 leaves the first communication zone. The satellites 100, 150 can be non-geostationary and can be in low-earth orbit (LEO), but any suitable orbit can be utilized.

At a fourth time period T4, the first ground station 200 will establish communication with another paired satellite (not shown), before the first paired satellites 100 leaves the first communication zone and initiates communication with the second ground station 250 (or a different ground station).

The first satellites 102, 152 and the second satellites 152, 154 communicate with one another via the communication link 106, 156, respectively, to cooperate during operation, such as during the handover or hand-off procedure. The satellites 102, 152, 104, 154 communicate to control which satellite 102, 152, 104, 154 within each pair 100, 150, respectively, communicates with which antenna of which ground station 200, 250. For example, the first satellite 102, 152 can respectively control operation of the second satellite 104, 154; the second satellite 104, 154 can respectively control operation of the first satellite 102, 152; or the satellites 102, 152, 104, 154 can jointly decide how each satellite 102, 104 operate (e.g., frequency, beam, direction, and which antenna 202, 204, 252, 254 to communicate with).

In one embodiment, the satellites 102, 152, 104, 154 can include a processing device to perform various functions and operations in accordance with the invention. The processing device can be, for instance, a processor, application specific integrated circuits (ASIC), or controller. All or parts of the system, processes, and/or data utilized in the invention can be stored on or read from a storage device. The storage device can have stored thereon machine executable instructions for performing the processes of the invention. The processing device can execute software that can be stored on the storage device. Unless indicated otherwise, the process is preferably implemented in automatically by the processor substantially in real time without delay.

The storage device can be a memory or non-transitory computer readable medium, such as any tangible medium that can store, encode or carry non-transitory instructions for execution by the computer and cause the computer to perform any one or more of the operations of the invention described herein, or that is capable of storing, encoding, or carrying data structures utilized by or associated with instructions.

In one embodiment, the ground antennas 202, 204, 252, 254 are 4.5 Mts terminals, with a 1.2 Mts user and a 0.7 Mts user, though any suitable size and parameters can be provided.

It is further noted that while the invention has been described for use to pair satellites in the illustrated embodiment, it is noted that it can be utilized with other suitable devices. For example, the satellite can be any element, object or device that can be placed into space. The satellite can be a satellite module or satellite component, including for example any one or more of a processor 304, receiver(s)/transmitter(s), and/or antenna. For example, one or both of the satellites or satellite modules can be an antenna, a portion of an antenna, or any other element, object, device or component that is placed into space, typically to support, for example, communication with other satellites, ground station, and/or end user device. And, the invention can include more than two satellites or satellite modules.

The invention includes the satellite pair 100, 150 and its operation, such as to conduct handover. Still further, the invention includes the ground station system and operation. The ground station communicates with the first and second satellite pairs 100, 150. For example, during handover, the ground stations configurate (e.g., positioning, tracking) the first and second antenna 202, 204 to communicate with the first and second satellites 102, 152, 104, 154 in accordance with the configuration described above, to provide seamless handover from a descending satellite pair to an ascending satellite pair. For example, the first ground station 200 (e.g., the first antenna 202) acquires a signal from the ascending first satellite pair 100 (e.g., the second satellite 104) before the first ground station (e.g., the second antenna 204) loses communication with the descending second satellite pair 150 (e.g., the first satellite 152). The first ground station 200 can then communicate with both satellites of the first satellite pair 100. As the first satellite pair descends, it (e.g., the second satellite 104) can communicate with a new ground station and the first ground station (e.g., the first antenna 202) can continue to communicate with the first satellite pair (e.g., the first satellite 102). The ground stations 200, 250 can each have a processing device 206, 256 such as a processor or controller, which controls the operation of the antennas 102, 152, 104, 154.

The description and drawings of the present invention provided in the paper should be considered as illustrative only of the principles of the invention. The invention may be configured in a variety of ways and is not intended to be limited by the preferred embodiment. Numerous applications of the invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

The invention claimed is:

1. A communication system, comprising: a first satellite, a second satellite, and a physical connection connecting the first satellite with the second satellite, wherein the physical connection comprises a mechanical connection that maintains the first satellite at a predetermined distance from the second satellite; wherein the mechanical connection rotationally connects with the first satellite and the second satellite, whereby the first satellite can rotate with respect to said second satellite.

2. The system of claim 1, wherein the first and second satellites are configured to communicate with different ground station antenna during handover.

3. The system of claim 1, wherein the first and second satellites are configured to point to a ground station independent of each other and configured to establish independent communication with a different ground location.

4. The system of claim 1, wherein the first and second satellites are in non-geostationary orbit.

5. The system of claim 1, wherein the first satellite is configured to communicates with the second satellite.

6. A communication system, comprising: a first satellite, a second satellite, and a physical connection connecting the first satellite with the second satellite, wherein the first and second satellites are configured to rotate with respect to one another via the physical connection to independently establish communication with one or more ground antenna.

7. The system of claim 6, further comprising a communications connection linking the first satellite with the second satellite, wherein the communications connection comprises an electronic cable or a wireless connection.

8. The system of claim 6, wherein the physical connection comprises a mechanical connection that maintains said first satellite at a fixed distance from said second satellite.

9. The system of claim 8, wherein said mechanical connection rotationally connects with said first satellite and said second satellite, whereby said first satellite can rotate with respect to said second satellite.

10. A communication system, comprising:
a mechanical connector having a first end and a second end opposite the first end;
a first satellite coupled to the first end of said connector;
a second satellite coupled to the second end of said connector; and
an electronic connector having a first electronic end coupled to the first satellite and a second electronic end coupled to the second satellite; wherein the mechanical connection rotationally connects with the first satellite and the second satellite, whereby the first satellite can rotate with respect to said second satellite.

11. The system of claim 10, wherein the first and second satellites communicate with different ground station antenna during handover.

12. The system of claim 10, wherein the first and second satellites point to a target a ground station independent of each other and establish independent communication with a different ground location.

13. The system of claim 10, wherein the first and second satellites are in non-geostationary orbit.

14. The system of claim 10, wherein the first satellite communicates with the second satellite.

15. A communication system, comprising:
a connector having a first end and a second end opposite the first end;
a first satellite coupled to the first end of said connector; and
a second satellite coupled to the second end of the connector, wherein said connector the comprises a mechanical connector having a predetermined length that maintains the first satellite at a predetermined distance from the second satellite; wherein the mechanical connection rotationally connects with the first satellite and the second satellite, whereby the first satellite can rotate with respect to said second satellite.

16. The system of claim 15, further comprising an electronic connector having a first electronic end coupled to said first satellite and a second electronic end coupled to said second satellite.

17. The system of claim 16, wherein said electronic connector comprises an electronic cable.

18. A communication system, comprising:
a connector having a first end and a second end opposite the first end;
a first satellite coupled to the first end of said connector; and
a second satellite coupled to the second end of said connector, wherein said connector rotationally connects with said first satellite and said second satellite, whereby said first satellite can rotate with respect to said second satellite.

19. A communication system, comprising:
- a connector having a first end and a second end opposite the first end;
- a first satellite coupled to the first end of said connector; and
- a second satellite coupled to the second end of said connector, wherein the first and second satellites are configured to rotate with respect to one another via the connector to independently establish communication with ground antenna.

\* \* \* \* \*

UNITED STATES PATENT AND TRADEMARK OFFICE
CERTIFICATE OF CORRECTION

PATENT NO. : 11,943,044 B1
APPLICATION NO. : 16/827139
DATED : March 26, 2024
INVENTOR(S) : Abel Avellan It is certified that error appears in the above-identified patent and that said Letters Patent is hereby corrected as shown below:

In the Claims

Column 6, Line 25, Claim 10:
Now reads: "connection"; should read -- connector --

Column 6, Line 45, Claim 15:
Now reads: "wherein said connector the comprises"; should read -- wherein said connector comprises --

Column 6, Line 49, Claim 15:
Now reads: "connection"; should read -- connector --

Signed and Sealed this
Seventh Day of May, 2024

Katherine Kelly Vidal
*Director of the United States Patent and Trademark Office*